US012689634B2

(12) United States Patent
Kulakowski et al.

(10) Patent No.: US 12,689,634 B2
(45) Date of Patent: Jul. 21, 2026

(54) THREAT DETECTION WITH EVENT STREAM CORRELATION USING JOIN KEYS

(71) Applicant: International Business Machines Corporation, Armonk, NY (US)

(72) Inventors: Christopher A. Kulakowski, Austin, TX (US); Joshua J. Powers, Round Hill, VA (US); Mauro Marzorati, Lutz, FL (US); John A. Adams, Pleasant Hill, MO (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 18/882,987

(22) Filed: Sep. 12, 2024

(65) Prior Publication Data

US 2026/0075063 A1     Mar. 12, 2026

(51) Int. Cl.
*H04L 9/40* (2022.01)
(52) U.S. Cl.
CPC ................................ *H04L 63/1416* (2013.01)
(58) Field of Classification Search
CPC ...... G06F 21/577; G06F 21/552; G06F 21/55; G06F 21/554; G06F 21/566; G06F 16/2456; G06F 16/24568; H04L 63/1408; H04L 63/14; H04L 63/1433; H04L 63/1425; H04L 63/1416; H04L 63/1441
See application file for complete search history.

(56) References Cited

U.S. PATENT DOCUMENTS

| | | | |
|---|---|---|---|
| 7,509,539 | B1 | 3/2009 | Denefleh et al. |
| 9,325,568 | B2 | 4/2016 | Rácz et al. |
| 9,342,431 | B2 | 5/2016 | Sluiman et al. |
| 10,038,704 | B2 | 7/2018 | Stolfo et al. |

(Continued)

FOREIGN PATENT DOCUMENTS

| | | |
|---|---|---|
| CN | 104468545 A | 3/2015 |
| EP | 3374870 A1 | 9/2018 |

OTHER PUBLICATIONS

Author unknown, "rename ContextProcessld_decimal AS TargetProcessld_decimal," Subreddit r/crowdstrike, 2020, 6 pages, reddit.com, accessed Jul. 31, 2024, https://www.reddit.com/r/crowdstrike/comments/hr1kyb/rename_contextprocessid_decimal_as/?rdt=48223.

(Continued)

*Primary Examiner* — Tae K Kim
(74) *Attorney, Agent, or Firm* — Yee & Associates, P.C.

(57) ABSTRACT

Automatically identifying join keys to correlate events is provided. A group of fields of a plurality of fields corresponding to a plurality of events having a percentage of cardinality and entropy of values greater than a defined threshold percentage level for the cardinality and the entropy is identified as a group of join keys corresponding to the plurality of events that occurred within a defined timeframe. It is determined which particular join keys of the group of join keys corresponding to the plurality of events that occurred within the defined timeframe are common join keys among the plurality of events. Pairs of events in the plurality of events that occurred within the defined timeframe are correlated based on the common join keys between each pair of events to form a set of correlated event pairs for detecting threats.

20 Claims, 5 Drawing Sheets

(56) References Cited

U.S. PATENT DOCUMENTS

| | | | | |
|---|---|---|---|---|
| 10,623,429 | B1 * | 4/2020 | Vines ....................... | H04L 41/40 |
| 11,010,223 | B2 | 5/2021 | Dasgupta et al. | |
| 12,292,969 | B2 * | 5/2025 | Kasturi ................. | G06F 21/554 |
| 2016/0078229 | A1 * | 3/2016 | Gong .................... | G06F 21/577 |
| | | | | 726/24 |
| 2017/0277727 | A1 * | 9/2017 | Chen ..................... | G06F 16/215 |
| 2017/0318035 | A1 * | 11/2017 | Baughman ........... | G06N 3/0442 |
| 2018/0198811 | A1 * | 7/2018 | Bartos .................. | H04L 63/302 |
| 2018/0219890 | A1 * | 8/2018 | Rehak ..................... | H04L 63/14 |
| 2020/0106786 | A1 * | 4/2020 | Thayer ............... | H04L 63/1416 |
| 2020/0186544 | A1 * | 6/2020 | Dichiu ................. | G06F 21/552 |
| 2021/0092141 | A1 * | 3/2021 | Gamble ............. | H04L 63/1433 |
| 2022/0131879 | A1 * | 4/2022 | Naik ................... | H04L 63/1416 |
| 2022/0353280 | A1 * | 11/2022 | Thayer ............... | H04L 63/1425 |
| 2023/0315603 | A1 * | 10/2023 | Pham .................... | G06F 11/323 |
| | | | | 707/600 |
| 2023/0315841 | A1 * | 10/2023 | Pham ................. | G06F 16/9038 |
| | | | | 726/1 |
| 2023/0315884 | A1 * | 10/2023 | Pham ................. | G06F 21/6254 |
| | | | | 726/27 |
| 2023/0362184 | A1 * | 11/2023 | Gelman .............. | H04L 63/1433 |
| 2024/0134978 | A1 * | 4/2024 | Licudi .................... | G06F 9/542 |
| 2024/0214003 | A1 * | 6/2024 | Cooper .............. | H03M 7/4043 |
| 2025/0086397 | A1 * | 3/2025 | Conort ............... | G06F 16/2456 |
| 2025/0165506 | A1 * | 5/2025 | Sterbling ........... | G06F 16/2264 |
| 2025/0286903 | A1 * | 9/2025 | Fortkort ............. | H04L 63/1416 |

OTHER PUBLICATIONS

Dindar et al., "Efficiently Correlating Complex Events over Live and Archived Data Streams," Proceedings of the 5th ACM international conference on Distributed event-based system (DEBS '11), Jul. 11, 2011, 12 pages, acm.org, accessed Jul. 31, 2024, https://doi.org/10.1145/2002259.2002293.

Zhu et al., "Auto-Join: Joining Tables by Leveraging Transformations," International Conference on Very Large Databases (VLDB), May 2017, pp. 1-19, microsoft.com, accessed Jul. 31, 2024, https://www.microsoft.com/en-us/research/wp-content/uploads/2016/12/autojoin-fullversion.pdf.

* cited by examiner

COMPUTING ENVIRONMENT
100

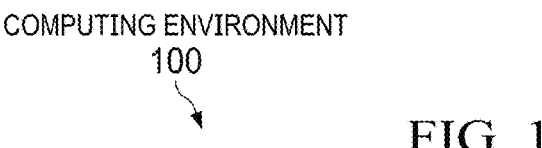

FIG. 1

COMPUTER     101

PROCESSOR SET     110

120 — PROCESSING CIRCUITRY        CACHE — 121

111 — COMMUNICATION FABRIC

112 — VOLATILE MEMORY

PERSISTENT STORAGE     113

122 — OPERATING SYSTEM        INTELLIGENT JOIN KEY IDENTIFICATION CODE — 200

PERIPHERAL DEVICE SET     114

123 — UI DEVICE SET     124 — STORAGE     IoT SENSOR SET — 125

NETWORK MODULE     115

103
END USER DEVICE

PRIVATE CLOUD
106

WAN
102

REMOTE SERVER
REMOTE DATABASE
130

104

GATEWAY     140

PUBLIC CLOUD     105

141 — CLOUD ORCHESTRATION MODULE        HOST PHYSICAL MACHINE SET — 142

143 — VIRTUAL MACHINE SET        CONTAINER SET — 144

CORRELATING EVENTS USING
COMMON JOIN KEYS PROCESS
400

FIG. 5A

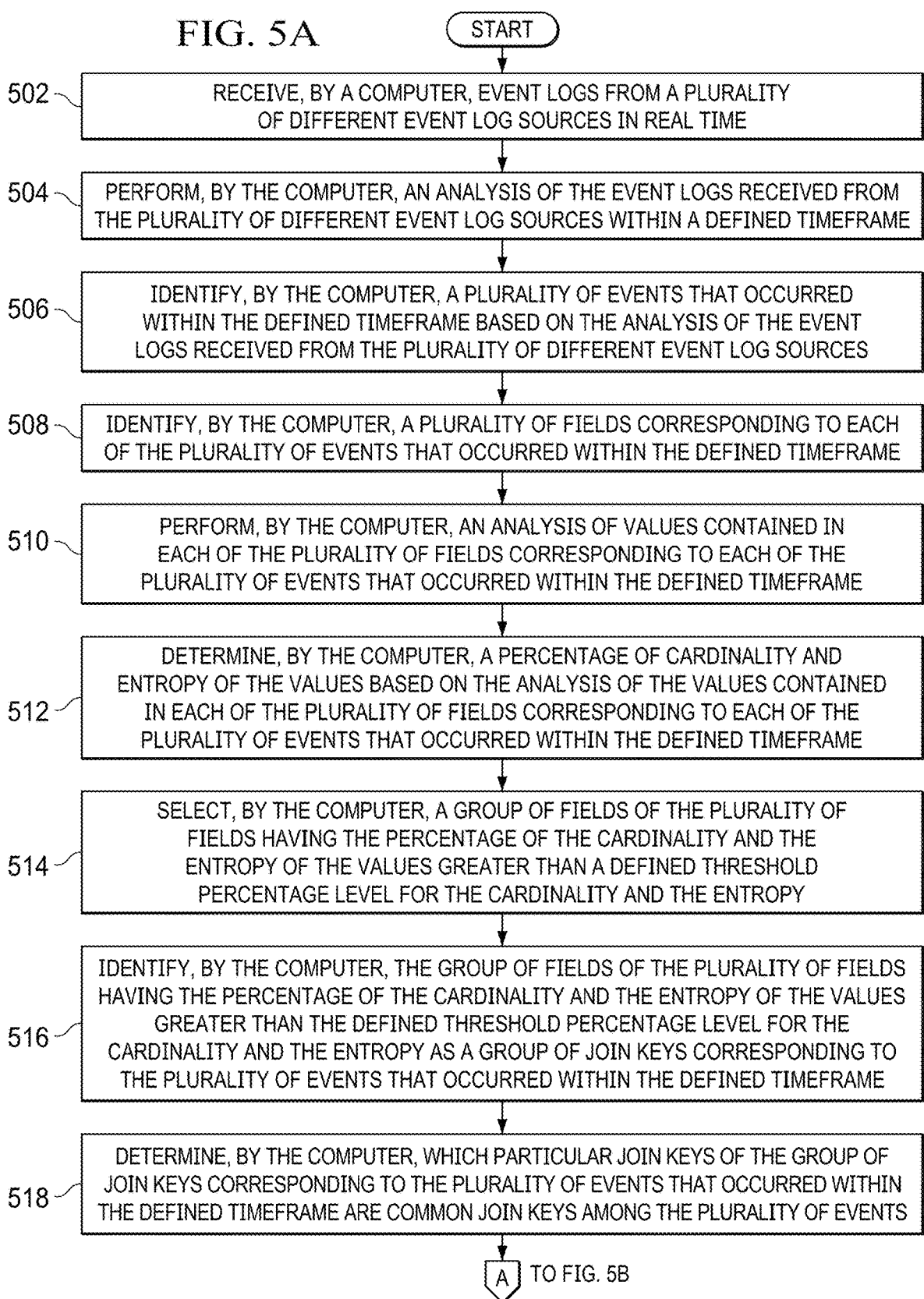

START

502 — RECEIVE, BY A COMPUTER, EVENT LOGS FROM A PLURALITY OF DIFFERENT EVENT LOG SOURCES IN REAL TIME

504 — PERFORM, BY THE COMPUTER, AN ANALYSIS OF THE EVENT LOGS RECEIVED FROM THE PLURALITY OF DIFFERENT EVENT LOG SOURCES WITHIN A DEFINED TIMEFRAME

506 — IDENTIFY, BY THE COMPUTER, A PLURALITY OF EVENTS THAT OCCURRED WITHIN THE DEFINED TIMEFRAME BASED ON THE ANALYSIS OF THE EVENT LOGS RECEIVED FROM THE PLURALITY OF DIFFERENT EVENT LOG SOURCES

508 — IDENTIFY, BY THE COMPUTER, A PLURALITY OF FIELDS CORRESPONDING TO EACH OF THE PLURALITY OF EVENTS THAT OCCURRED WITHIN THE DEFINED TIMEFRAME

510 — PERFORM, BY THE COMPUTER, AN ANALYSIS OF VALUES CONTAINED IN EACH OF THE PLURALITY OF FIELDS CORRESPONDING TO EACH OF THE PLURALITY OF EVENTS THAT OCCURRED WITHIN THE DEFINED TIMEFRAME

512 — DETERMINE, BY THE COMPUTER, A PERCENTAGE OF CARDINALITY AND ENTROPY OF THE VALUES BASED ON THE ANALYSIS OF THE VALUES CONTAINED IN EACH OF THE PLURALITY OF FIELDS CORRESPONDING TO EACH OF THE PLURALITY OF EVENTS THAT OCCURRED WITHIN THE DEFINED TIMEFRAME

514 — SELECT, BY THE COMPUTER, A GROUP OF FIELDS OF THE PLURALITY OF FIELDS HAVING THE PERCENTAGE OF THE CARDINALITY AND THE ENTROPY OF THE VALUES GREATER THAN A DEFINED THRESHOLD PERCENTAGE LEVEL FOR THE CARDINALITY AND THE ENTROPY

516 — IDENTIFY, BY THE COMPUTER, THE GROUP OF FIELDS OF THE PLURALITY OF FIELDS HAVING THE PERCENTAGE OF THE CARDINALITY AND THE ENTROPY OF THE VALUES GREATER THAN THE DEFINED THRESHOLD PERCENTAGE LEVEL FOR THE CARDINALITY AND THE ENTROPY AS A GROUP OF JOIN KEYS CORRESPONDING TO THE PLURALITY OF EVENTS THAT OCCURRED WITHIN THE DEFINED TIMEFRAME

518 — DETERMINE, BY THE COMPUTER, WHICH PARTICULAR JOIN KEYS OF THE GROUP OF JOIN KEYS CORRESPONDING TO THE PLURALITY OF EVENTS THAT OCCURRED WITHIN THE DEFINED TIMEFRAME ARE COMMON JOIN KEYS AMONG THE PLURALITY OF EVENTS

A   TO FIG. 5B

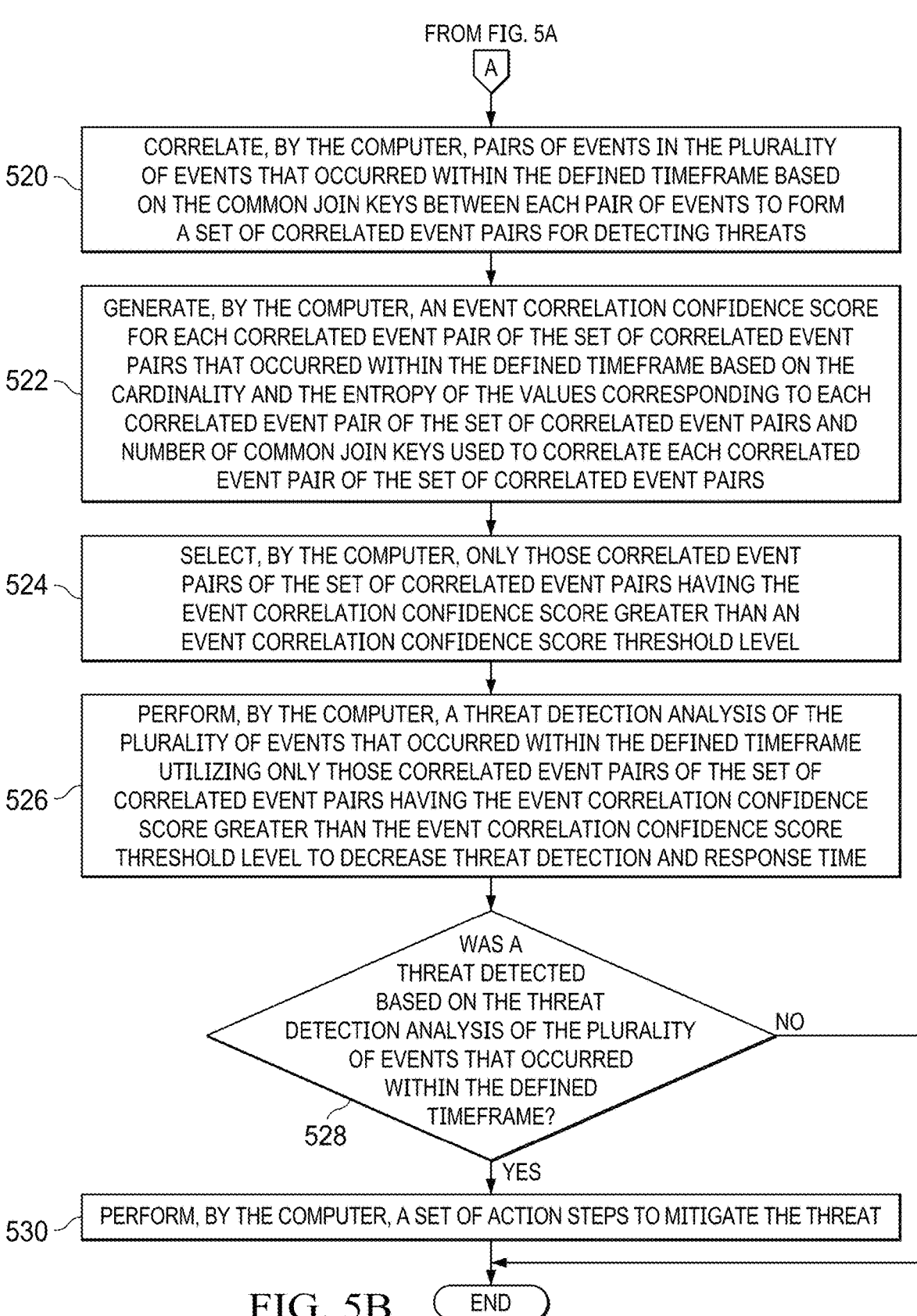

FROM FIG. 5A

A

520 — CORRELATE, BY THE COMPUTER, PAIRS OF EVENTS IN THE PLURALITY OF EVENTS THAT OCCURRED WITHIN THE DEFINED TIMEFRAME BASED ON THE COMMON JOIN KEYS BETWEEN EACH PAIR OF EVENTS TO FORM A SET OF CORRELATED EVENT PAIRS FOR DETECTING THREATS

522 — GENERATE, BY THE COMPUTER, AN EVENT CORRELATION CONFIDENCE SCORE FOR EACH CORRELATED EVENT PAIR OF THE SET OF CORRELATED EVENT PAIRS THAT OCCURRED WITHIN THE DEFINED TIMEFRAME BASED ON THE CARDINALITY AND THE ENTROPY OF THE VALUES CORRESPONDING TO EACH CORRELATED EVENT PAIR OF THE SET OF CORRELATED EVENT PAIRS AND NUMBER OF COMMON JOIN KEYS USED TO CORRELATE EACH CORRELATED EVENT PAIR OF THE SET OF CORRELATED EVENT PAIRS

524 — SELECT, BY THE COMPUTER, ONLY THOSE CORRELATED EVENT PAIRS OF THE SET OF CORRELATED EVENT PAIRS HAVING THE EVENT CORRELATION CONFIDENCE SCORE GREATER THAN AN EVENT CORRELATION CONFIDENCE SCORE THRESHOLD LEVEL

526 — PERFORM, BY THE COMPUTER, A THREAT DETECTION ANALYSIS OF THE PLURALITY OF EVENTS THAT OCCURRED WITHIN THE DEFINED TIMEFRAME UTILIZING ONLY THOSE CORRELATED EVENT PAIRS OF THE SET OF CORRELATED EVENT PAIRS HAVING THE EVENT CORRELATION CONFIDENCE SCORE GREATER THAN THE EVENT CORRELATION CONFIDENCE SCORE THRESHOLD LEVEL TO DECREASE THREAT DETECTION AND RESPONSE TIME

WAS A THREAT DETECTED BASED ON THE THREAT DETECTION ANALYSIS OF THE PLURALITY OF EVENTS THAT OCCURRED WITHIN THE DEFINED TIMEFRAME?   — NO

528

YES

530 — PERFORM, BY THE COMPUTER, A SET OF ACTION STEPS TO MITIGATE THE THREAT

FIG. 5B         END

THREAT DETECTION WITH EVENT STREAM CORRELATION USING JOIN KEYS

BACKGROUND

The disclosure relates generally to threat detection and more specifically to correlating events to detect threats.

Threat detection is needed for cybersecurity today. As cyber-attacks become more sophisticated and devastating, threat detection systems can help to identify cyber-attacks in progress and block vulnerabilities or mitigate the cyber-attacks before the cyber-attacks result in a breach.

Threat detection is a cybersecurity process for finding, analyzing, and mitigating threats. Threat detection is performed via constant system and network monitoring to identify signs of malicious activity or potential vulnerabilities. Analyzing detected threats involves identifying the nature, origin, and potential impact of detected threats.

Entities, such as, for example, enterprises, companies, businesses, organizations, institutions, agencies, and the like, commonly utilize security information and event management systems and intrusion detection systems to detect threats. For example, intrusion detection systems can identify unusual network activity, while security information and event management systems can aggregate and analyze data from various sources to detect threats.

SUMMARY

According to one illustrative embodiment, a method is provided. A group of fields of a plurality of fields corresponding to a plurality of events having a percentage of cardinality and entropy of values greater than a defined threshold percentage level for the cardinality and the entropy is identified as a group of join keys corresponding to the plurality of events that occurred within a defined timeframe. It is determined which particular join keys of the group of join keys corresponding to the plurality of events that occurred within the defined timeframe are common join keys among the plurality of events. Pairs of events in the plurality of events that occurred within the defined timeframe are correlated based on the common join keys between each pair of events to form a set of correlated event pairs for detecting threats. According to other illustrative embodiments, a computer system and computer program product are provided.

BRIEF DESCRIPTION OF THE DRAWINGS

FIG. 1 is a pictorial representation of a computing environment in which
illustrative embodiments may be implemented;

FIGS. 5A-5B are a flowchart illustrating a process for automatically identifying join keys to correlate events in accordance with an illustrative embodiment.

DETAILED DESCRIPTION

Figures 2, 3:
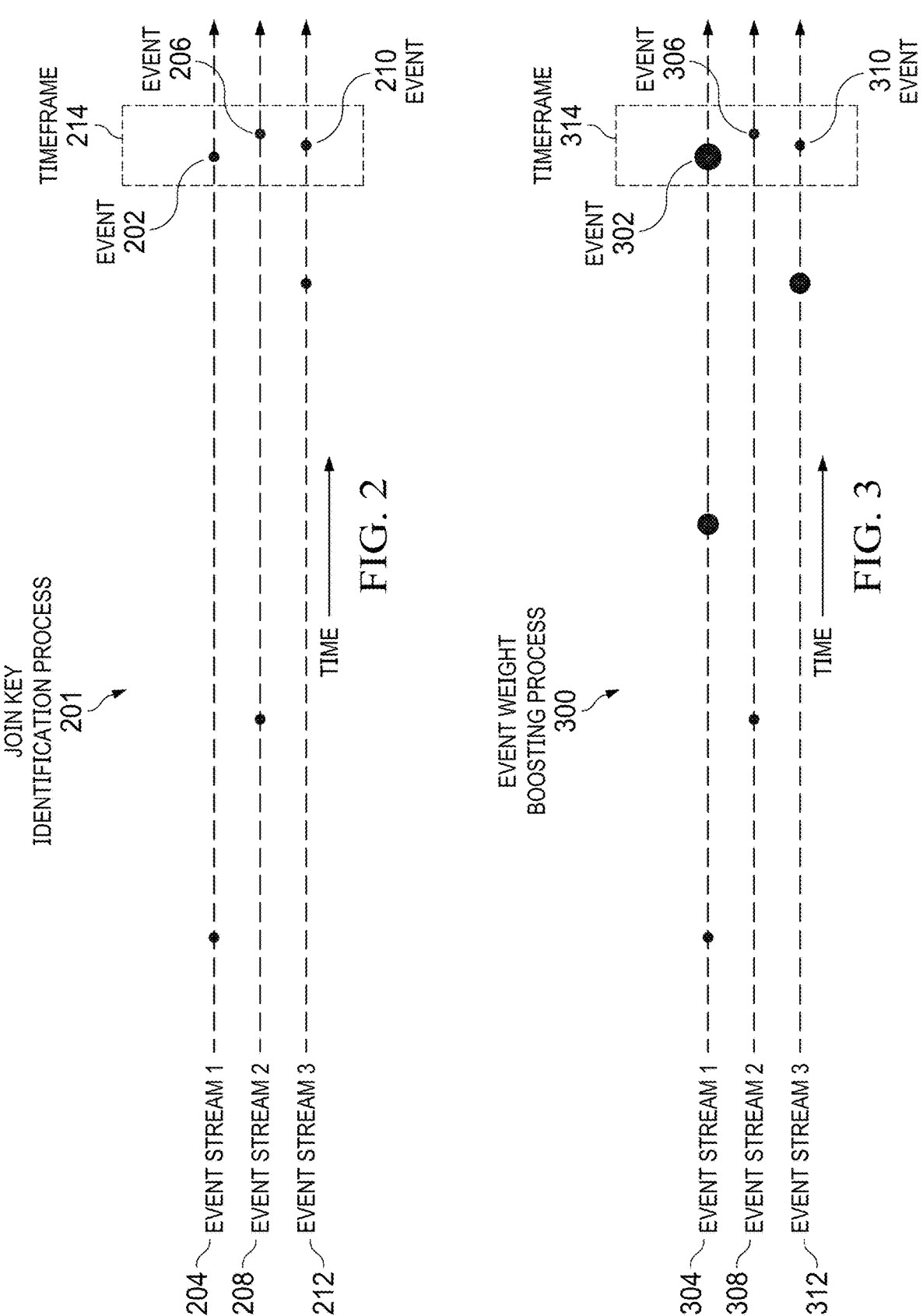
FIG. 2 is a diagram illustrating an example of a join key identification process in accordance with an illustrative embodiment.
FIG. 3 is a diagram illustrating an example of an event weight boosting process in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and is not intended to assert or imply any limitation with regard to the environments in which different embodiments may be implemented. Many modifications to the depicted environment can be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as intelligent join key identification code 200. For example, intelligent join key identification code 200 correlates multiple cybersecurity events together based on automatically identifying common join keys among the multiple cybersecurity events to decrease mean time to detect and mean time to respond. For example, intelligent join key identification code 200 utilizes the common join keys to identify patterns among cybersecurity events that indicate a cybersecurity threat for faster threat detection and response.

In addition to intelligent join key identification code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and intelligent join key identification code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in intelligent join key identification code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

Network module 115 is the collection of computer software, hardware, and firmware that allows computer 101 to communicate with other computers through WAN 102.

Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a security analyst who utilizes the intelligent join key identification services provided by computer 101), and may take any of the forms discussed above in connection with computer 101. EUD 103 typically receives helpful and useful data from the operations of computer 101. For example, in a hypothetical case where computer 101 is designed to provide a detected threat notification to the end user, this notification would typically be communicated from network module 115 of computer 101 through WAN 102 to EUD 103. In this way, EUD 103 can display, or otherwise present, the detected threat notification to the end user. In some embodiments, EUD 103 may be a client device, such as a thin client, heavy client, mainframe computer, desktop computer, laptop computer, tablet computer, smart phone, smart glasses, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a detected threat notification based on event log data, then this event log data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Cybersecurity threat detection using event correlation is a complicated challenge for cybersecurity professionals. Event correlation involves analyzing and connecting together multiple individual cybersecurity events generated by various systems and devices across a network corresponding to an entity (e.g., enterprise, company, business, organization, institution, agency, or the like) to identify patterns of cybersecurity threats. An objective of cybersecurity threat detection is to assemble seemingly unrelated events to detect a cybersecurity threat and then generate a unified description of the cyber-attack. Another objective of cybersecurity threat detection is to put together low fidelity events (e.g., events having a low threat confidence level), which when correlated together can indicate a suspicious or malicious pattern.

However, several challenges associated with current cybersecurity threat detection solutions can include, for example, volume of data, data diversity, false positives, time sensitivity, complexity of cyber-attacks, lack of event context, and the like. With regard to volume of data, cybersecurity telemetry involves the collection of a vast amount of event data from a plurality of different sources, such as, for example, security information and event management systems, intrusion detection systems, firewalls, antivirus software, network logs, and the like. Managing and processing this vast amount of data in real time is a significant challenge. With regard to data diversity, data collected from these different sources often come in various formats and protocols, making normalization and correlation of the collected data difficult. For example, security operations center analysts typically work with data in various different formats and structures, which can lead to inconsistencies and misinterpretations. With regard to false positives, when correlating events, sometimes seemingly related events are actually unrelated causing false positives, which wastes time and resources. Reducing false positives is needed to optimize security operations center efficiency. With regard to time sensitivity, in most cases, cybersecurity threats need quick responses. For example, security operations center analysts need to identify and respond to potential cybersecurity threats promptly. Any delays in event correlation can lead to security breaches, which can cause data loss, data corruption, and the like. With regard to complexity of cyber-attacks, sophisticated cyber-attacks often involve multiple stages and techniques that span various systems and layers. Correlating these disparate elements requires in-depth knowledge and advanced tools. With regard to lack of event context, understanding the context of cybersecurity events is needed for accurate correlation. For example, without knowing the correct context of an event, determining whether that event is part of a larger cyber-attack or simply an isolated incident is difficult.

Typically, cybersecurity teams rely on security information and event management systems for event correlation to assist with the challenges noted above. However, current threat detection solutions for event correlation have limitations. One limitation of current threat detection solutions is that the join key used to correlate one cybersecurity event to another cybersecurity event is not always unique. This limitation of current threat detection solutions introduces false positives by correlating cybersecurity events that are actually unrelated. For example, take internet protocol (IP) addresses using network address translation and request for comment (RFC) 1918 addresses in private networks, these IP addresses are not unique and can be reused by multiple entities causing false positives by current threat detection solutions correlating cybersecurity events corresponding to different entities together that are actually unrelated.

Illustrative embodiments take into account and address the challenges noted above by intelligently identifying common join keys among cybersecurity events. For example, when correlating two or more cybersecurity events together, illustrative embodiments utilize common fields between cybersecurity events as a join key (e.g., similar as to how tables in a database are joined). However, values of the field corresponding to the join key should be unique to an entity, otherwise unrelated cybersecurity events can be inadvertently correlated causing the challenges described above.

Illustrative embodiments utilize four components to identify the join keys. The four components include a timeframe, event field value cardinality, event field value entropy, and event correlation confidence score. The timeframe is a period of time. The timeframe can be static or dynamic. In other words, illustrative embodiments can change the timeframe dynamically depending on the cybersecurity threat detection use case. Illustrative embodiments utilize the timeframe to correlate a group of cybersecurity events together.

The cardinality of a field (e.g., a column of data) corresponding to a cybersecurity event measures the uniqueness of the values in the field within the timeframe. For example, if the cardinality (i.e., uniqueness) of values of an event field is low, such as network address translation IP addresses, then illustrative embodiments determine that that event field is not a good candidate for illustrative embodiments to utilize as a join key for correlating cybersecurity events. Conversely, if the cardinality (i.e., uniqueness) of the values of the event field is high, such as email addresses, then illustrative embodiments determine that that event field is a good candidate for illustrative embodiments to utilize as a join key for correlating cybersecurity events. Illustrative embodiments can statistically determine the cardinality of the event field value based on, for example, type of data in the field. In addition, illustrative embodiments can utilize a defined percentage threshold level for unique values in a field to determine whether cardinality is low or high. The defined percentage threshold level for unique values can be, for example, 70%, 75%, 80%, 85%, 90%, or the like depending on the environment size and entity preference. For example, if the percentage of unique values contained in a given field is greater than or equal to the defined percentage threshold level for unique values (e.g., 90%), then illustrative embodiments determine that the cardinality of values in that field is high. As a result, illustrative embodiments identify that field as a join key candidate.

The entropy of a field corresponding to a cybersecurity event measures the randomness of the values in the field within the timeframe. For example, if the entropy (i.e., randomness) of the values of an event field is low, which indicates more homogeneous or similar values contained in the field, then illustrative embodiments determine that that event field is not a good candidate for illustrative embodiments to utilize as a join key for correlating cybersecurity events. Conversely, if the entropy (i.e., randomness) of the values of the event field is high, which indicates more heterogeneous or dissimilar values contained in the field, then illustrative embodiments determine that that event field is a good candidate for illustrative embodiments to utilize as a join key for correlating cybersecurity events. Illustrative embodiments can utilize a defined percentage threshold level for random values contained in a field to determine whether entropy is low or high. The defined percentage threshold level for random values can be, for example, 70%, 75%, 80%, 85%, 90%, or the like depending on the environment size and entity preference. For example, if the percentage of random values contained in a given field is greater than or equal to the defined percentage threshold level for random values, then illustrative embodiments determine that the entropy of values in that field is high. As a result, illustrative embodiments identify that field as a join key candidate.

The event correlation confidence score provides a measure of assurance that correlated cybersecurity events are actually related. For example, a low event correlation confidence score (e.g., less than a minimum event correlation confidence score threshold level) indicates less likelihood or a low level of assurance that the correlated cybersecurity events are related. The minimum event correlation confidence score threshold level may be, for example, 70%, 75%, 80%, 85%, 90%, or the like, depending on the scale and complexity of the computing environment. Conversely, a high event correlation confidence score (e.g., greater than or equal to the minimum confidence score threshold level) indicates a greater likelihood or a high level of assurance that the correlated cybersecurity events are related.

Illustrative embodiments determine the event correlation confidence score for correlated cybersecurity events based on the combination of event field value cardinality, event field value entropy, and number of identified common join keys corresponding to the correlated cybersecurity events. For example, high event field value cardinality, high event field value entropy, and a high number of identified common join keys corresponding to the correlated cybersecurity events equals a high event correlation confidence score.

Conversely, low event field value cardinality, low event field value entropy, and a low number of identified join keys corresponding to the correlated cybersecurity events equals a low event correlation confidence score.

As an illustrative example use case, illustrative embodiments detect four logged computing events within the defined timeframe that individually or without any context appear benign. However, when illustrative embodiments correlate the four events together, a suspicious pattern of events emerges. In this illustrative example scenario, the four events include a remote login, followed by file download, followed by process execution, and finally followed by lateral network movement. The remote login is an authentication event with candidate join keys of username, IP address, and host name. The file download is an endpoint detection and response (EDR) event with candidate join keys of username, host name, and file name. The process execution is an EDR event with candidate join keys of username, host name, and file name. The lateral movement is an authentication event with candidate join keys of username, IP address, and host name. The four events with corresponding candidate join keys is shown in the table below:

| Event Name | Observable Event | Username | IP address | Hostname | Filename |
|---|---|---|---|---|---|
| Remote Login | Authentication | X | X | X | |
| File Download | EDR event | X | | X | X |
| Process Execution | EDR event | X | | X | X |
| Lateral Movement | Authentication | X | X | X | |

Illustrative embodiments identify the candidate join keys above based on the timeframe, cardinality of the event field values, and entropy of the event field values as determined above. It should be noted that a record corresponding to an event is comprised of a plurality of fields (e.g., columns) containing values. Within the timeframe (e.g., a 5-minute period of time), illustrative embodiments correlate the remote login event to the file download event using the common join keys of username and host name, correlate the file download event to the process execution event using the common join keys username, host name, and file name, and correlate the process execution event to the lateral movement event using the common join keys username and host name. Illustrative embodiments continue the event correlation process throughout the cyber-attack during the entire 5-minute timeframe using the common join keys identified by illustrative embodiments.

Illustrative embodiments can also apply a weight boosting function to an event field that corresponds to a regular expression pattern specified in a database for the type of values contained in that particular event field. For example, illustrative embodiments utilize a database of predefined regular expression patterns corresponding to IP addresses in an IP address event field, a database of predefined regular expression patterns corresponding to usernames in a username event field, a database of predefined regular expression patterns corresponding to executable file names in an executable file name event field, a database of predefined regular expression patterns corresponding to process numbers in a process number event field, and the like. In other words, illustrative embodiments track values contained in fields of events that match predefined regular expression patterns created by a user, such as, for example, a security analyst.

As a result, illustrative embodiments decrease mean time to respond by illustrative embodiments decreasing the mean time to detect a threat based on correlating multiple events together from different event log sources using the common join keys identified by illustrative embodiments among the multiple events. Thus, illustrative embodiments provide one or more technical solutions that overcome a technical problem with an inability of current threat detection solutions to automatically identify common join keys among events to correlate certain events together for threat detection. As a result, these one or more technical solutions provide a technical effect and practical application in the field of threat detection.

With reference now to FIG. 2, a diagram illustrating an example of join key identification process is depicted in accordance with an illustrative embodiment. Join key identification process 201 can be implemented in a computer, such as computer 101 in FIG. 1.

In this example, join key identification process 201 includes event 202 of event stream 1 204, event 206 of event stream 2 208, and event 210 of event stream 3 212. However, it should be noted that join key identification process 201 is intended as an example only and not as a limitation on illustrative embodiments. For example, join key identification process 201 can include any number of events and event streams.

Timeframe 214 is a defined period of time that can be static or changed dynamically depending on the threat detection use case. The computer utilizes timeframe 214 to correlate event 202, event 206, and event 210 together. In other words, timeframe 214 dictates and limits the number of events that the computer will try to correlate. The computer can statically define timeframe 214 by a measure of seconds, minutes, hours, or the like. For example, timeframe 214 can be 5 minutes, which includes all events occurring within that 5-minute time period. In other words, the computer does not evaluate any events occurring outside the defined 5-minute timeframe for correlation. Alternatively, the computer can dynamically define timeframe 214 so that the number of events evaluated shifts depending on a predefined condition or rule for that specific use case.

For example, a user receives an email containing a link to malicious code in the user's inbox. However, the user is on vacation when the email arrives in the inbox. Upon returning from vacation, the user opens the email and activates the link to the malicious code using, for example, a mouse click. As a result, the user downloads the malicious code into the user's device. In addition, user interaction launches the malicious code. In this example, the computer dynamically defines the timeframe so that the computer includes all five events (i.e., receiving email event, vacationing user event, activating link event, downloading malicious code event, and launching malicious code event), which occurred over an extended period of time.

As another illustrative example, the computer can receive a cybersecurity event log from, for example, a web application firewall that includes the event fields of destination IP addresses, source IP addresses, usernames, event categories, and network protocols. The computer then determines the cardinality or uniqueness of the values in each of the event fields within the defined timeframe. For example, the computer determines that the number of unique destination IP addresses is 21,723, the number of unique source IP addresses is 17,523, the number of unique usernames is 3,166, the number of unique event categories is 2, and the number of unique network protocols is 2 within the defined timeframe. Based on the percentage of unique values of each of these event fields, the computer determines that the event fields of destination IP addresses, source IP addresses, and usernames are the best candidates to utilize as join keys for correlating to other events because these best candidates for join keys are more likely tied to a particular device, user, or other resource.

The higher the entropy or randomness of values in an event field, the better suited that event field is to utilize as a join key, whereas the lower the entropy of the values in an event field, the less suited that event field is to utilize as a join key. An example script for calculating entropy of values in each field of an event using a library is as follows:

```
import library as pd
import math
# Load your dataset into library(replace 'your_dataset.csv' with your
dataset file)
data = pd.read_csv('your_dataset.csv')
# Function to calculate entropy
def calculate_entropy(field):
    # Count the occurrences of each unique value in the field
    value_counts = field.value_counts( )
    # Calculate the total number of samples in the field
    total_samples = length(field)
    # Calculate entropy
    entropy = 0
    for count in value_counts:
        probability = count / total_samples
        entropy -= probability * math.log2(probability)
    return entropy
# Calculate entropy for each field
field_entropy = { }
for field_name in data.fields:
    entropy = calculate_entropy(data[field_name])
    field_entropy[field_name] = entropy
# Print the entropy for each field
for field, entropy in field_entropy.items( ):
    print(f"Entropy of '{field}': {entropy:.4f}").
```

With reference now to FIG. 3, a diagram illustrating an example of an event weight boosting process is depicted in accordance with an illustrative embodiment. Event weight boosting process 300 can be implemented in a computer, such as computer 101 in FIG. 1.

In this example, event weight boosting process 300 includes event 302 of event stream 1 304, event 306 of event stream 2 308, and event 310 of event stream 3 312. Event 302 of event stream 1 304, event 306 of event stream 2 308, and event 310 of event stream 3 312 can be, for example, event 202 of event stream 1 204, event 206 of event stream 2 208, and event 210 of event stream 3 212 in FIG. 2. However, it should be noted that event weight boosting process 300 is intended as an example only and not as a limitation on illustrative embodiments. For example, event weight boosting process 300 can include any number of events and event streams. Timeframe 314 is a defined period of time that can be static or changed dynamically depending on the threat detection use case.

The computer can optionally utilize a weight boosting function to influence an event correlation confidence score corresponding to correlated events. In this example, the computer utilizes the weight boosting function to apply a weight boosting value to event 302 to increase the weight of event 302 as compared to event 306 and event 310. For example, even though the computer determined that the values corresponding to event 302 had low cardinality and entropy, the computer also determined that event 302 was an event that should be considered when correlating events. As a result, the computer increased the weight of event 302 to influence the event correlation confidence score associated with event 302 to a greater degree.

As an illustrative example, the computer, based on historic information (e.g., threat intelligence reports and the like), determines that threat actors have been observed sourcing from IP addresses matching the regular expression patterns 129.(42|44).(16|17).* and *.(23|27|28).*.50, which are located in a database of regular expression patterns corresponding to IP addresses. Also, these regular expression patterns may correspond to different threat actors. As a result, the computer can apply a different weight boosting value to each different regular expression pattern. It should be noted that each of these regular expression patterns matching the source IP addresses has a different cardinality. The computer utilizes the weight boosting function to apply a weight boosting value to the source IP address that matches the most specific regular expression pattern (e.g., the regular expression pattern with the least cardinality) in the database. Similarly, for the join key corresponding to the event field filename, executing files corresponding to the regular expression patterns /sbin/* vs /usr/*/bin/* vs /usr/bin/* vs /bin/* vs /*/*/*/*; each pattern has a different cardinality and in this way the computer can weight execution of '/bin/chroot' differently from '/sbin/chroot' but similar to '/bin/sh'. Another illustrative example would be weight boosting for '/usr/local/bin/chroot' and '/usr/slocal/bin/sh' as being the same pattern, and /usr/*/bin/* being more specific than /*/*/*/*. The computer applies the weight boosting function at the event level to amplify or increase the signal strength corresponding to a given event, such as event 302.

Afterwards, the computer determines the event correlation confidence score for each pair of correlated events based on the cardinality of values of each event field, the entropy of the values of each event field, and the number of common join keys the computer used to correlate the events. For example, the event correlation confidence score is high when the computer utilize multiple common join keys, which the computer identified during event field value cardinality and entropy checks, to correlate a pair of events.

As an illustrative example, event 1 includes 3 fields that the computer identified as good join keys and event 2 includes 2 fields that the computer identified as good join keys. However, the computer identified only 1 field as being in common between event 1 and event 2. In other words, the computer only used 1 common join key to correlate event 1 and event 2. As a result, the computer determined that the correlation between event 1 and event 2 is low.

As another illustrative example, event 3 includes 2 fields that the computer identified as good join keys and event 4 includes 2 fields that the computer identified as good join keys. In addition, the computer identified both fields as being in common between event 3 and event 4. In other words, the computer used 2 common join keys to correlate event 3 and event 4. As a result, the computer determined that the correlation between event 3 and event 4 is medium.

An example of a script that the computer can utilize to calculate the event correlation confidence score is as follows:

```
// Function to calculate confidence score based on join key counts
int calculateConfidenceScore(int event_join_key_count, int
common_join_keys_count) {
```

-continued

```
    // Check that each field has a good join key
    if (event_join_key_count ≤ 0) {
        return 0; // no_join_key
    } else if (common_join_keys_count == 0) {
        return -1; // no_relationship
    } else if (common_join_keys_count == 1) {
        return 1; // low confidence_score
    } else if (common_join_keys_count == 2) {
        return 2; // medium confidence_score
    } else {
        return 3; // high confidence_score
    }
}
int main( ) {
    int event_join_key_count = 3; // Replace with the actual join key
    count
    int common_join_keys_count = 2; // Replace with the actual common
    join keys count
    int confidence_score =
    calculateConfidenceScore(event_join_key_count,
    common_join_keys_count);
    switch (confidence_score) {
        case 0:
            printf("No join key\n");
            break;
        case -1:
            printf("No relationship\n");
            break;
        case 1:
            printf("Low confidence score\n");
            break;
        case 2:
            printf("Medium confidence score\n");
            break;
        case 3:
            printf("High confidence score\n");
            break;
        default:
            printf("Invalid input\n");
            break;
    }
    return 0;
}.
```

Thus, the computer evaluates the event correlation confidence score on each pair of correlated events. Consequently, if the computer correlates, for example, 4 events together, the computer outputs at least 3 event correlation confidence scores. This is similar to the previous example above regarding the computer correlating the remote login event to the file download event, correlating the file download event to the process execution event, and finally correlating the process execution event to the lateral movement event. For the 4 events, the computer calculates an event correlation confidence score between event 1 and event 2, an event correlation confidence score between event 2 and event 3, and an event correlation confidence score between event 3 and event 4.

However, it should be noted that all 4 events could be correlated together. Also, direction of event correlation is irrelevant because the computer is only concerned about which events are related to one another, unless the specific use case includes a specific condition or rule requiring that the order of events should be followed or maintained. If all 4 events correlate to one another, then the computer will calculate 6 event correlation confidence scores. For example, the computer calculates an event correlation confidence score between event 1 and event 2, an event correlation confidence score between event 1 and event 3, an event correlation confidence score between event 1 and event 4, an event correlation confidence score between event 2 and event 3, an event correlation confidence score between event 2 and event 4, and an event correlation confidence score between event 3 and event 4.

Figure 4:
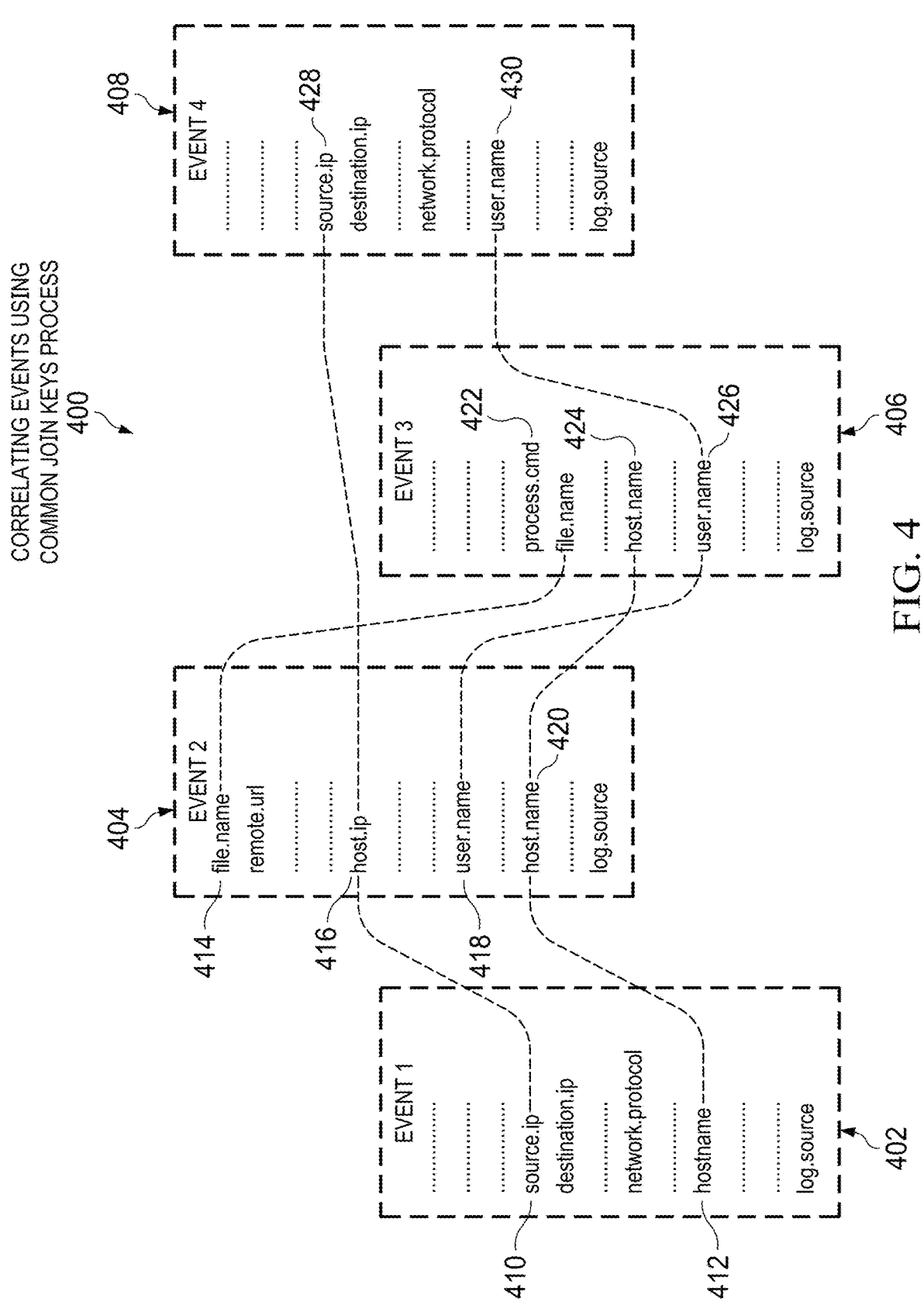
FIG. 4 is a diagram illustrating an example of a correlating events using common join keys process in accordance with an illustrative embodiment.

With reference now to FIG. 4, a diagram illustrating an example of a correlating events using common join keys process is depicted in accordance with an illustrative embodiment. Correlating events using common join keys process 400 can be implemented in a computer, such as computer 101 in FIG. 1.

In this example, correlating events using common join keys process 400 includes event 1 402, event 2 404, event 3 406, and event 4 408. However, it should be noted that correlating events using common join keys process 400 is intended as an example only and not as a limitation on illustrative embodiments. For example, correlating events using common join keys process 400 can include any number of events. Moreover, it should be noted that the computer performs event correlation using common join keys process 400 within a defined timeframe, such as timeframe 314 in FIG. 3.

In this example, event 1 402 includes join key 410 (i.e., event field source IP/destination IP) and join key 412 (i.e., event field host name). Event 2 404 includes join key 414 (i.e., event field file name), join key 416 (i.e., event field host IP), join key 418 (i.e., event field username), and join key 420 (i.e., event field host name). Event 3 406 includes join key 422 (i.e., event field file name), join key 424 (i.e., event field host name), and join key 426 (i.e., event field username). Event 4 408 includes join key 428 (i.e., event field source IP/destination IP) and join key 430 (i.e., event field username).

In this example, the computer determines that join key 410 and join key 416 are common join keys between event 1 402 and event 2 404, along with join key 412 and join key 420. As a result, the computer determines that the correlation between event 1 402 and event 2 404 is medium because event 1 402 and event 2 404 have 2 common join keys between them. The computer also determines that join key 414 and join key 422 are common join keys between event 2 404 and event 3 406, along with join key 418 and join key 426 and join key 420 and join key 424. As a result, the computer determines that the correlation between event 2 404 and event 3 406 is high because event 2 404 and event 3 406 have 3 common join keys between them. In addition, the computer determines that join key 416 and join key 428 are common join keys between event 2 404 and event 4 408. As a result, the computer determines that the correlation between event 2 404 and event 4 408 is low because event 2 404 and event 4 408 only have 1 common join key between them. Further, the computer determines that join key 426 and join key 430 are common join keys between event 3 406 and event 4 408. As a result, the computer determines that the correlation between event 3 406 and event 4 408 is low because event 3 406 and event 4 408 only have 1 common join key between them.

With reference now to FIGS. 5A-5B, a flowchart illustrating a process for automatically identifying join keys to correlate events is shown in accordance with an illustrative embodiment. The process shown in FIGS. 5A-5B may be implemented in a computer, such as, for example, computer 101 in FIG. 1. For example, the process shown in FIGS. 5A-5B may be implemented by intelligent join key identification code 200 in FIG. 1.

The process begins when the computer receives event logs from a plurality of different event log sources in real time (step 502). The computer performs an analysis of the event logs received from the plurality of different event log sources within a defined timeframe (step 504). The computer identifies a plurality of events that occurred within the defined timeframe based on the analysis of the event logs received from the plurality of different event log sources (step 506).

In addition, the computer identifies a plurality of fields corresponding to each of the plurality of events that occurred within the defined timeframe (step 508). The computer performs an analysis of values contained in each of the plurality of fields corresponding to each of the plurality of events that occurred within the defined timeframe (step 510). Further, the computer determines a percentage of cardinality and entropy of the values based on the analysis of the values contained in each of the plurality of fields corresponding to each of the plurality of events that occurred within the defined timeframe (step 512).

Afterward, the computer selects a group of fields of the plurality of fields having the percentage of the cardinality and the entropy of the values greater than a defined threshold percentage level for the cardinality and the entropy (step 514). The computer identifies the group of fields of the plurality of fields having the percentage of the cardinality and the entropy of the values greater than the defined threshold percentage level for the cardinality and the entropy as a group of join keys corresponding to the plurality of events that occurred within the defined timeframe (step 516). Furthermore, the computer determines which particular join keys of the group of join keys corresponding to the plurality of events that occurred within the defined timeframe are common join keys among the plurality of events (step 518).

The computer correlates pairs of events in the plurality of events that occurred within the defined timeframe based on the common join keys between each pair of events to form a set of correlated event pairs for detecting threats (step 520). The computer generates an event correlation confidence score for each correlated event pair of the set of correlated event pairs that occurred within the defined timeframe based on the cardinality and the entropy of the values corresponding to each correlated event pair of the set of correlated event pairs and number of common join keys used to correlate each correlated event pair of the set of correlated event pairs (step 522). The computer selects only those correlated event pairs of the set of correlated event pairs having the event correlation confidence score greater than an event correlation confidence score threshold level (step 524).

The computer performs a threat detection analysis of the plurality of events that occurred within the defined timeframe utilizing only those correlated event pairs of the set of correlated event pairs having the event correlation confidence score greater than the event correlation confidence score threshold level to decrease threat detection and response time (step 526). The computer makes a determination as to whether a threat was detected based on the threat detection analysis of the plurality of events that occurred within the defined timeframe (step 528).

If the computer determines that no threat was detected based on the threat detection analysis of the plurality of events that occurred within the defined timeframe, no output of step 528, then the process terminates thereafter. If the computer determines that a threat was detected based on the threat detection analysis of the plurality of events that occurred within the defined timeframe, yes output of step 528, then the computer performs a set of action steps to mitigate the threat (step 530). The set of action steps to mitigate the threat include, for example, at least one of sending a notification to a security analyst regarding the threat, isolating any affected devices, applying security patches to the affected devices, reporting the threat to other threat detection systems, and the like. Thereafter, the process terminates.

Thus, illustrative embodiments of the present disclosure provide a computer-implemented method, computer system, and computer program product for automatically identifying join keys to correlate events. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
identifying a group of fields of a plurality of fields corresponding to a plurality of events having a percentage of cardinality and entropy of values greater than a defined threshold percentage level for the cardinality and the entropy as a group of join keys corresponding to the plurality of events that occurred within a defined timeframe;
determining which particular join keys of the group of join keys corresponding to the plurality of events that occurred within the defined timeframe are common join keys among the plurality of events;
applying a weight boosting function to at least one event of the plurality of events based on values in at least one field of the at least one event matching a predefined regular expression pattern stored in a database of regular expression patterns, wherein the weight boosting function applies a weight boosting value to the at least one event to increase influence of the at least one event on an event correlation confidence score;
correlating pairs of events in the plurality of events that occurred within the defined timeframe based on the common join keys between each pair of events to form a set of correlated event pairs for detecting threats;
generating the event correlation confidence score for each correlated event pair of the set of correlated event pairs based on the cardinality and the entropy of the values corresponding to each correlated event pair, number of common join keys used to correlate each correlated event pair, and the weight boosting value applied to any event in each correlated event pair
selecting those correlated event pairs of the set of correlated event pairs having the event correlation confidence score greater than an event correlation confidence score threshold level;
performing a threat detection analysis of the plurality of events that occurred within the defined timeframe utilizing only those correlated event pairs of the set of correlated event pairs having the event correlation confidence score greater than the event correlation confidence score threshold level to decrease threat detection and response time; and
determining whether a cybersecurity threat was detected based on the threat detection analysis of the plurality of events that occurred within the defined timeframe.

2. The method of claim 1, further comprising:
responsive to determining that the threat was detected based on the threat detection analysis of the plurality of events that occurred within the defined timeframe, performing a set of action steps to mitigate the threat.

3. The method of claim 2, wherein the set of action steps to mitigate the threat include at least one of sending a notification to a security analyst regarding the threat, isolating any affected devices, applying security patches to the affected devices, and reporting the threat to other threat detection systems.

4. The method of claim 1, further comprising:
receiving event logs from a plurality of different event log sources in real time;
performing an analysis of the event logs received from the plurality of different event log sources within the defined timeframe; and
identifying the plurality of events that occurred within the defined timeframe based on the analysis of the event logs received from the plurality of different event log sources.

5. The method of claim 1, further comprising:
identifying the plurality of fields corresponding to each of the plurality of events that occurred within the defined timeframe; and
performing an analysis of the values contained in each of the plurality of fields corresponding to each of the plurality of events that occurred within the defined timeframe.

6. The method of claim 5, further comprising:
determining the percentage of the cardinality and the entropy of the values based on the analysis of the values contained in each of the plurality of fields corresponding to each of the plurality of events that occurred within the defined timeframe; and
selecting the group of fields of the plurality of fields having the percentage of the cardinality and the entropy of the values greater than the defined threshold percentage level for the cardinality and the entropy.

7. The method of claim 1, wherein applying the weight boosting function comprises:
applying the weight boosting value to the at least one event at an event level to amplify a signal strength corresponding to the at least one event, wherein the database of regular expression patterns comprises a plurality of regular expression patterns organized for a specific type of values contained in the at least one field, and wherein the weight boosting value applied to the at least one event is determined based on a most specific regular expression pattern, of the plurality of regular expression patterns, that is matched by the values in the at least one field.

8. The method of claim 1, wherein the defined timeframe is dynamically defined such that a number of events of the plurality of events evaluated for correlation shifts depending on a predefined condition or rule corresponding to a threat detection use case, thereby enabling correlation of events occurring over an extended period of time.

9. A computer system comprising:
a processor set;
one or more computer-readable storage media; and
program instructions stored on the one or more computer-readable storage media to cause the processor set to perform operations comprising:
identifying a group of fields of a plurality of fields corresponding to a plurality of events having a percentage of cardinality and entropy of values greater than a defined threshold percentage level for the cardinality and the entropy as a group of join keys corresponding to the plurality of events that occurred within a defined timeframe;

determining which particular join keys of the group of join keys corresponding to the plurality of events that occurred within the defined timeframe are common join keys among the plurality of events;

applying a weight boosting function to at least one event of the plurality of events based on values in at least one field of the at least one event matching a predefined regular expression pattern stored in a database of regular expression patterns, wherein the weight boosting function applies a weight boosting value to the at least one event to increase influence of the at least one event on an event correlation confidence score;

correlating pairs of events in the plurality of events that occurred within the defined timeframe based on the common join keys between each pair of events to form a set of correlated event pairs for detecting threats;

generating the event correlation confidence score for each correlated event pair of the set of correlated event pairs based on the cardinality and the entropy of the values corresponding to each correlated event pair, number of common join keys used to correlate each correlated event pair, and the weight boosting value applied to any event in each correlated event pair;

selecting those correlated event pairs of the set of correlated event pairs having the event correlation confidence score greater than an event correlation confidence score threshold level;

performing a threat detection analysis of the plurality of events that occurred within the defined timeframe utilizing only those correlated event pairs of the set of correlated event pairs having the event correlation confidence score greater than the event correlation confidence score threshold level to decrease threat detection and response time; and determining whether a cybersecurity threat was detected based on the threat detection analysis of the plurality of events that occurred within the defined timeframe.

10. The computer system of claim 9, wherein the operations further comprise:

responsive to determining that the threat was detected based on the threat detection analysis of the plurality of events that occurred within the defined timeframe, performing a set of action steps to mitigate the threat.

11. The computer system of claim 9, wherein applying the weight boosting function comprises:

applying the weight boosting value to the at least one event at an event level to amplify a signal strength corresponding to the at least one event, wherein the database of regular expression patterns comprises a plurality of regular expression patterns organized for a specific type of values contained in the at least one field, and wherein the weight boosting value applied to the at least one event is determined based on a most specific regular expression pattern, of the plurality of regular expression patterns, that is matched by the values in the at least one field.

12. The computer system of claim 9, wherein the defined timeframe is dynamically defined such that a number of events of the plurality of events evaluated for correlation shifts depending on a predefined condition or rule corresponding to a threat detection use case, thereby enabling correlation of events occurring over an extended period of time.

13. A computer program product comprising:

one or more computer-readable storage media; and program instructions stored on the one or more computer-readable storage media to perform operations comprising:

identifying a group of fields of a plurality of fields corresponding to a plurality of events having a percentage of cardinality and entropy of values greater than a defined threshold percentage level for the cardinality and the entropy as a group of join keys corresponding to the plurality of events that occurred within a defined timeframe;

determining which particular join keys of the group of join keys corresponding to the plurality of events that occurred within the defined timeframe are common join keys among the plurality of events;

applying a weight boosting function to at least one event of the plurality of events based on values in at least one field of the at least one event matching a predefined regular expression pattern stored in a database of regular expression patterns, wherein the weight boosting function applies a weight boosting value to the at least one event to increase influence of the at least one event on an event correlation confidence score;

correlating pairs of events in the plurality of events that occurred within the defined timeframe based on the common join keys between each pair of events to form a set of correlated event pairs for detecting threats;

generating the event correlation confidence score for each correlated event pair of the set of correlated event pairs based on the cardinality and the entropy of the values corresponding to each correlated event pair, number of common join keys used to correlate each correlated event pair, and the weight boosting value applied to any event in each correlated event pair;

selecting those correlated event pairs of the set of correlated event pairs having the event correlation confidence score greater than an event correlation confidence score threshold level;

performing a threat detection analysis of the plurality of events that occurred within the defined timeframe utilizing only those correlated event pairs of the set of correlated event pairs having the event correlation confidence score greater than the event correlation confidence score threshold level to decrease threat detection and response time; and determining whether a cybersecurity threat was detected based on the threat detection analysis of the plurality of events that occurred within the defined timeframe.

14. The computer program product of claim 13, wherein the operations further comprise:

responsive to determining that the threat was detected based on the threat detection analysis of the plurality of events that occurred within the defined timeframe, performing a set of action steps to mitigate the threat.

15. The computer program product of claim 14, wherein the set of action steps to mitigate the threat include at least one of sending a notification to a security analyst regarding the threat, isolating any affected devices, applying security patches to the affected devices, and reporting the threat to other threat detection systems.

16. The computer program product of claim 13, wherein the operations further comprise:

receiving event logs from a plurality of different event log sources in real time;

performing an analysis of the event logs received from the plurality of different event log sources within the defined timeframe; and identifying the plurality of events that occurred within the defined timeframe based on the analysis of the event logs received from the plurality of different event log sources.

17. The computer program product of claim 13, wherein the operations further comprise:

identifying the plurality of fields corresponding to each of the plurality of events that occurred within the defined timeframe; and performing an analysis of the values contained in each of the plurality of fields corresponding to each of the plurality of events that occurred within the defined timeframe.

18. The computer program product of claim 17, wherein the operations further comprise:

determining the percentage of the cardinality and the entropy of the values based on the analysis of the values contained in each of the plurality of fields corresponding to each of the plurality of events that occurred within the defined timeframe; and selecting the group of fields of the plurality of fields having the percentage of the cardinality and the entropy of the values greater than the defined threshold percentage level for the cardinality and the entropy.

19. The computer program product of claim 13, wherein applying the weight boosting function comprises:

applying the weight boosting value to the at least one event at an event level to amplify a signal strength corresponding to the at least one event, wherein the database of regular expression patterns comprises a plurality of regular expression patterns organized for a specific type of values contained in the at least one field, and wherein the weight boosting value applied to the at least one event is determined based on a most specific regular expression pattern, of the plurality of regular expression patterns, that is matched by the values in the at least one field.

20. The computer program product of claim 13, wherein the defined timeframe is dynamically defined such that a number of events of the plurality of events evaluated for correlation shifts depending on a predefined condition or rule corresponding to a threat detection use case, thereby enabling correlation of events occurring over an extended period of time.

* * * * *